United States Patent [19]

Skogberg et al.

[11] Patent Number: 4,634,317
[45] Date of Patent: * Jan. 6, 1987

[54] METHOD OF ROCK BOLTING AND TUBE-FORMED EXPANSION BOLT

[75] Inventors: Bo T. Skogberg, Handen; Gunnar V. R. Romell, Djursholm, both of Sweden

[73] Assignee: Atlas Copco Aktiebolag, Nacka, Sweden

[*] Notice: The portion of the term of this patent subsequent to Jul. 10, 2001 has been disclaimed.

[21] Appl. No.: 572,858

[22] Filed: Jan. 23, 1984

Related U.S. Application Data

[63] Continuation of Ser. No. 127,776, Mar. 6, 1980, Pat. No. 4,459,067.

[30] Foreign Application Priority Data

Mar. 9, 1979 [SE] Sweden ................................ 7902129

[51] Int. Cl.⁴ ......................................... E21D 20/00
[52] U.S. Cl. ....................................... 405/259; 411/19; 411/61
[58] Field of Search ............ 405/259, 260, 261; 29/421 R, 421 E; 411/19, 20, 32, 33, 61, 74

[56] References Cited

U.S. PATENT DOCUMENTS

| | | | |
|---|---|---|---|
| 1,802,270 | 4/1931 | Rawlings | 411/61 |
| 2,015,081 | 9/1935 | McElhany et al. | 285/242 |
| 2,324,520 | 7/1943 | Lamson | 128/1 R |
| 2,342,732 | 2/1944 | Gudmundsen | 411/19 |
| 2,696,137 | 12/1954 | Thomas et al. | 411/74 |
| 3,148,577 | 9/1964 | Parsons | 411/20 |
| 3,349,567 | 10/1967 | Munn | 405/259 |
| 3,425,311 | 2/1969 | Levy | 411/479 |
| 3,568,450 | 3/1971 | Whiting | 405/289 |
| 3,665,719 | 5/1972 | Whiting | 405/289 |
| 3,922,867 | 12/1975 | Scott | 411/61 |
| 3,977,068 | 8/1976 | Krips | 29/421 R |
| 4,012,913 | 3/1977 | Scott | 411/479 |
| 4,125,937 | 11/1978 | Brown et al. | 29/421 R X |
| 4,350,462 | 9/1982 | Elders | 405/259 |
| 4,407,610 | 10/1983 | Elders | 405/259 |
| 4,472,087 | 9/1984 | Elders | 405/259 |
| 4,502,818 | 3/1985 | Elders | 405/259 |

FOREIGN PATENT DOCUMENTS

| | | |
|---|---|---|
| 1171310 | 10/1980 | Canada . |
| 0000576 | 2/1979 | European Pat. Off. . |
| 705153 | 5/1941 | Fed. Rep. of Germany . |
| 2728056 | 1/1979 | Fed. Rep. of Germany . |
| 1590097 | 4/1970 | France . |
| 2199090 | 4/1974 | France . |
| 2316528 | 1/1977 | France . |
| 91090 | 12/1937 | Sweden 411/33 |
| 183456 | 4/1963 | Sweden 411/33 |
| 615245 | 1/1980 | Switzerland . |
| 2015057 | 9/1979 | United Kingdom . |

Primary Examiner—David H. Corbin
Attorney, Agent, or Firm—Frishauf, Holtz, Goodman & Woodward

[57] ABSTRACT

A tube-formed rockbolt is partly circular in its cross-section and opposite its circular portion (12) it has a deep depression (16–18). Its ends are sealed and its outer end has a hole (44, 45) or a fitting (24) through which the bolt can be supplied with high pressure water that expands the tube to anchor it in the borehole.

16 Claims, 22 Drawing Figures

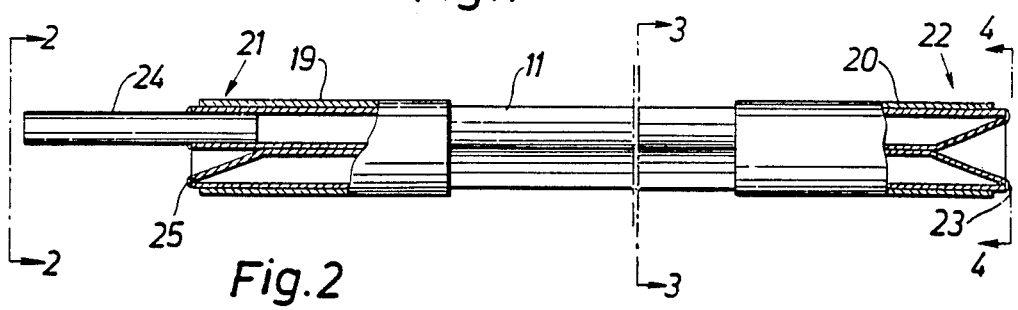
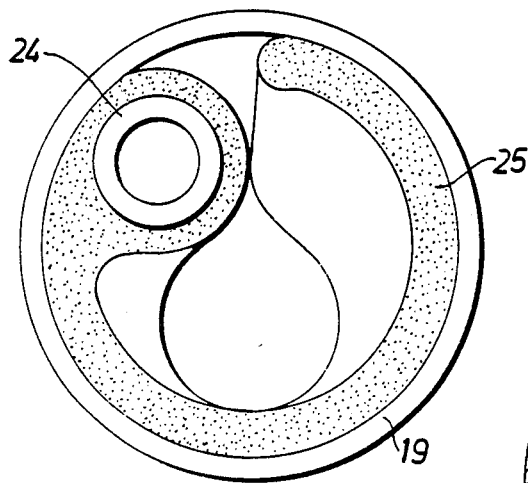
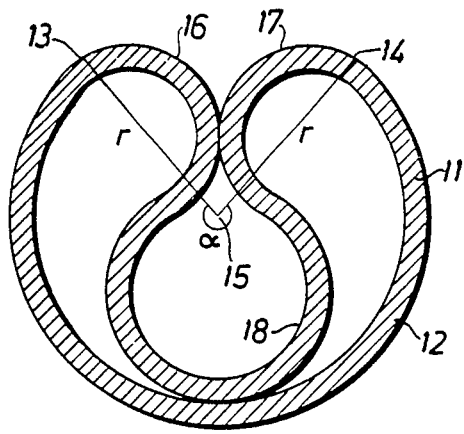
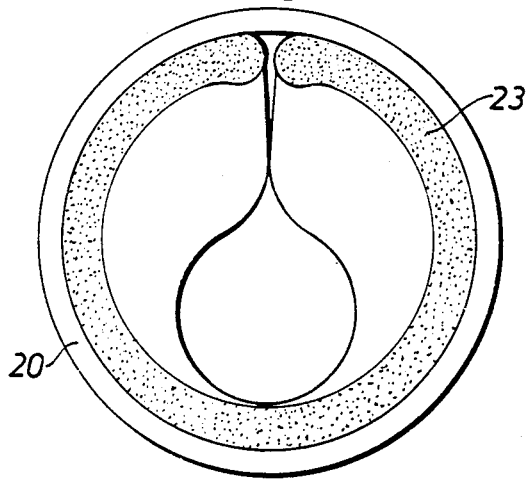

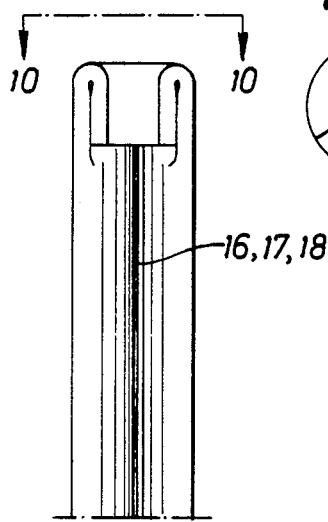
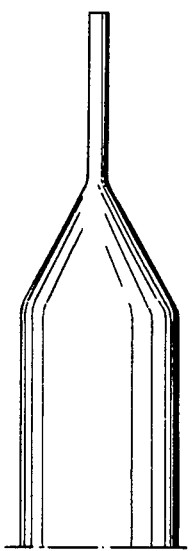
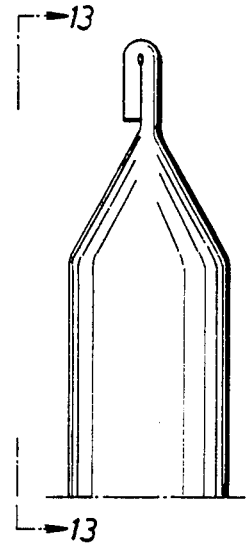
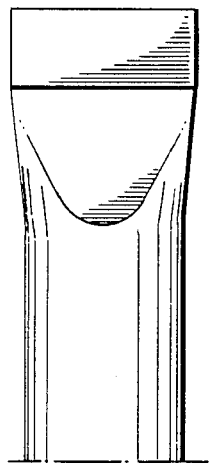
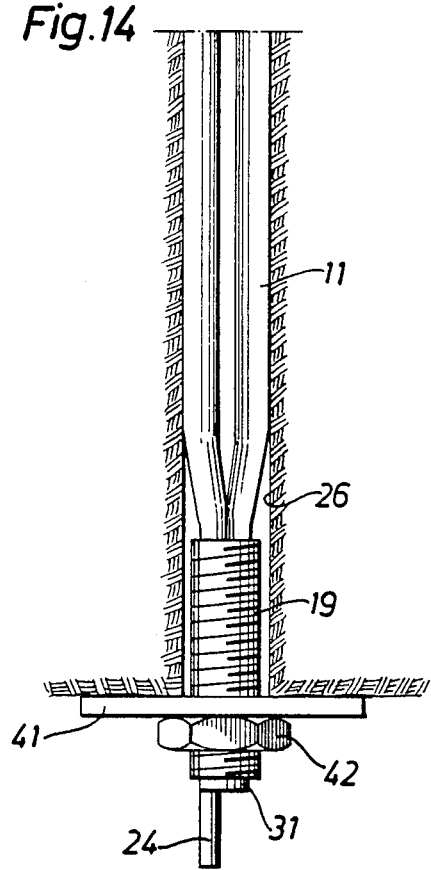

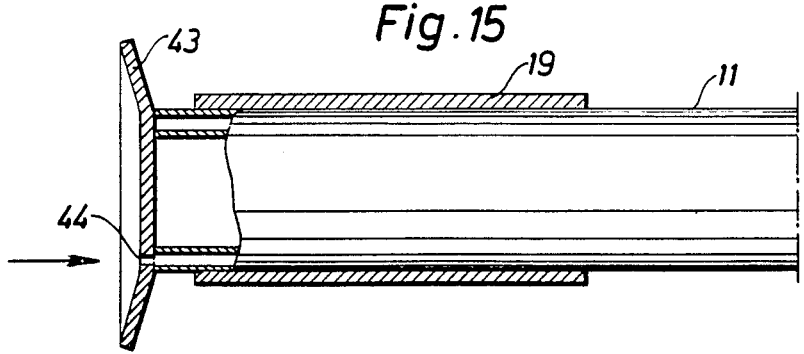
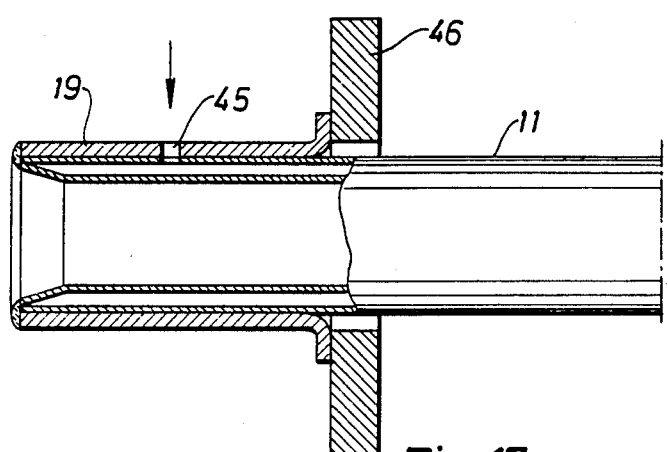
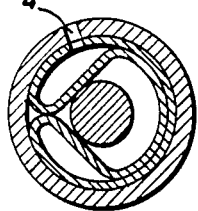
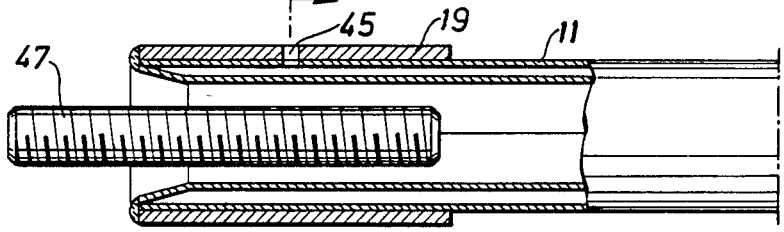
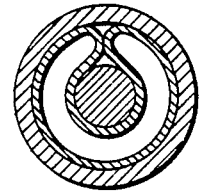
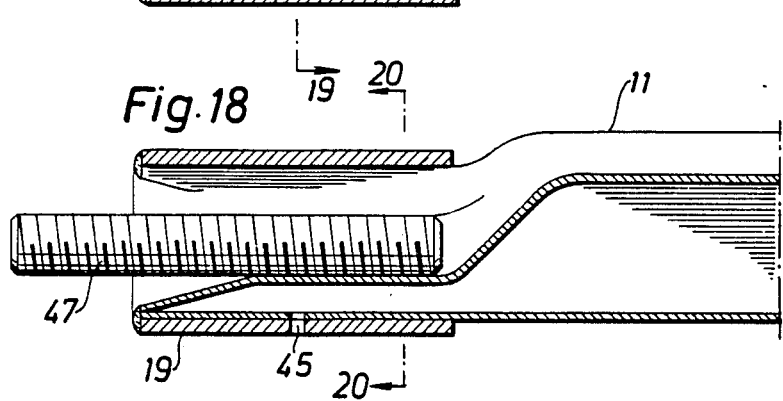

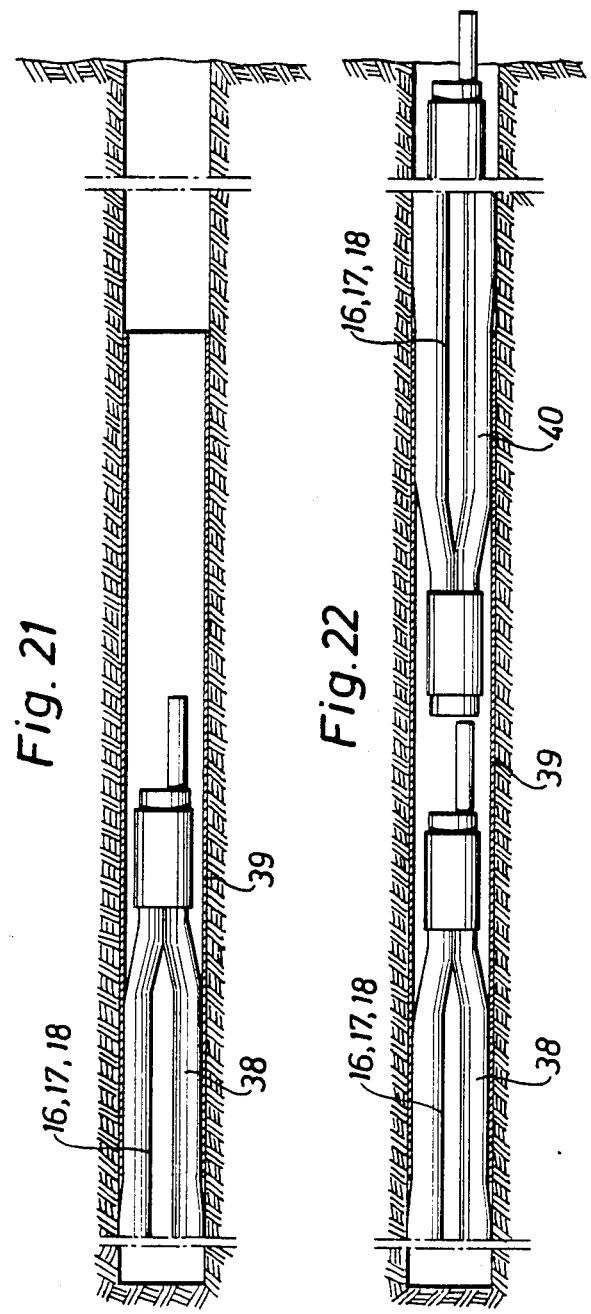

METHOD OF ROCK BOLTING AND TUBE-FORMED EXPANSION BOLT

This is a continuation of application Ser. No. 127,776 filed Mar. 6, 1980, now U.S. Pat. No. 4,459,067.

This invention relates to a method of rock bolting wherein a tube-formed bolt smaller than the hole is first inserted into the borehole and then expanded against the hole so that it becomes anchored. The invention refers also to an expansion bolt of a kind that can be used in accordance with the method.

In a prior art method, a rockbolt is used that has a short tube attached to its inner end. In the tube that has a circular cross-section, a weak explosive is arranged to expand the tube when detonating. Such bolts do not satisfactorily anchor in all rocks and the method is not very simple and it causes safety problems.

The invention will be described in more detail with reference to the accompanying drawings.

FIG. 1 is a side view, partly in section of a rockbolt according to the invention.

FIG. 2 is an end view seen as indicated by the arrows 2—2 in FIG. 1.

FIG. 3 is a cross-section on a larger scale taken along line 3—3 in FIG. 1. It is also a cross-section taken along line 3—3 in FIG. 6 and along line 3—3 in FIG. 8.

FIG. 4 is an end view as indicated by the arrows 4—4 in FIG. 1.

Figure 5:
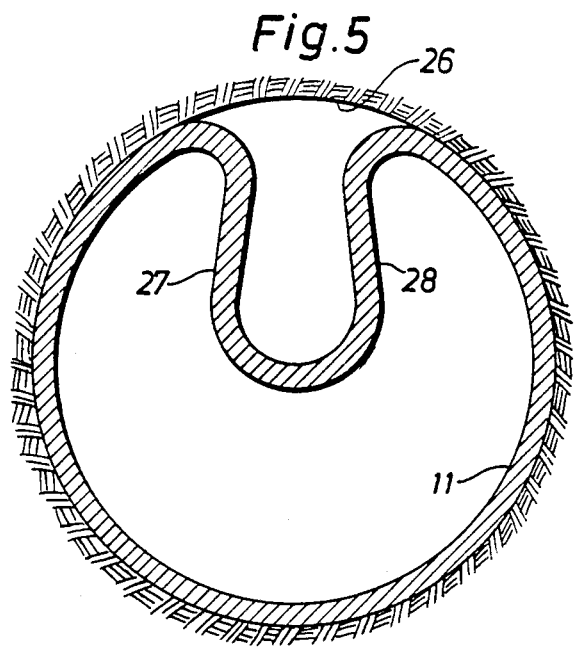

FIG. 5 is a cross-section corresponding to FIG. 3 but showing the rockbolt anchored in a borehole.

Figure 6:
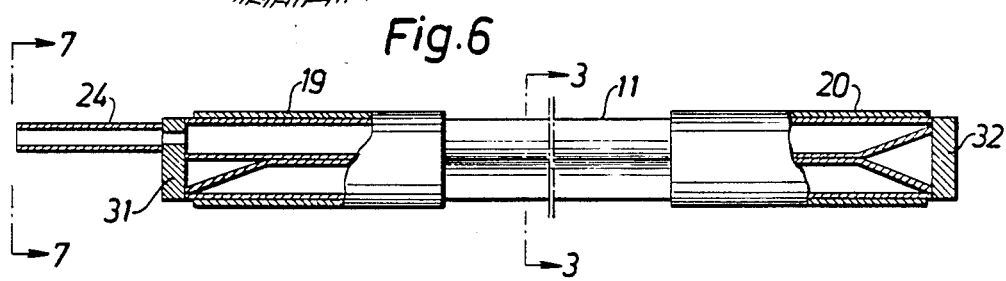

FIG. 6 is a side view, partly in section of the rockbolt shown in FIG. 1, the ends of the rockbolt being modified.

Figure 7:
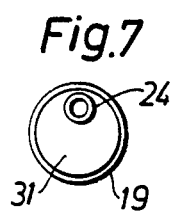

FIG. 7 is an end view seen as indicated by the arrows 7—7 in FIG. 6.

Figure 8:
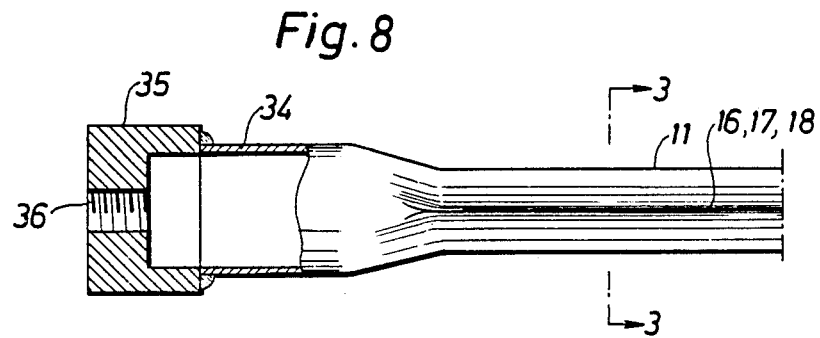

FIGS. 8 and 9 are side views of the outer end and bottom end respectively of another rockbolt according to the invention.

FIG. 10 is an end view seen as indicated by the arrows 10—10 in FIG. 9.

FIGS. 11-13 show the steps in sealing the bottom end shown in FIG. 9, FIG. 13 being a view seen as indicated by arrows 13—13 in FIG. 12.

FIGS. 14, 15 and 16 are side views of the outer ends of other alternative designs of rockbolts according to the invention.

FIG. 17 is a side view of the outer end of still another design.

FIG. 18 is a side view corresponding to FIG. 17 but showing the rockbolt when it has been expanded.

FIG. 19 is a cross-section taken along line 19—19 in FIG. 17.

FIG. 20 is a cross-section taken along line 20—20 in FIG. 18.

FIGS. 21 and 22 show two steps in joining two rockbolts in a borehole.

The rockbolt shown in FIG. 1 comprises a tube 11 with a profile as shown in FIG. 3. Between the points 13 and 14 in FIG. 3, the periphery of the tube forms a circle arc 12 having a focus 15, a radius r, and a centre angle α that exceeds 180°, actually the centre angle exceeds also 270°. The tube 11 has been drawn, rolled or folded to have a deep depression that comprises two gently curved outer portions 16, 17 and a gently curved bottom portion 18. These three portions 16–18 can have the form of circle arcs as shown in FIG. 3. The outer portions 16, 17 are bent more than 180° as shown in FIG. 3 and the bottom portion 18 extends past the point 15 and to or almost to the circular outer portion 12 of the tube. The two outer portions 16, 17 contact each other ore are at least adjacent each other. The diameter of the circle arc 12 is the largest gauge of the tube 11.

Strengthening sleeves 19, 20 are disposed on both ends 21, 22 of the tube 11, and the bottom end 22 of the tube 11 is first punched and then sealed by means of a weld 23. A tubular fitting 24 is inserted in the outer end 21 of the tube before the end is punched and sealed by means of a weld 25. In FIGS. 1 and 3, the bolt is shown before being used. In FIG. 5, the bolt is shown anchored in a borehole 26 is being expanded against the borehole. Before being expanded, the bolt can be freely inserted in the borehole 26 since it is substantially thinner than the borehole. The tube 11 is expanded by being pressurized by a fluid for example water of a pressure of for example 100–500 bar. The water is supplied from an external source through the fitting 24. The strengthening sleeves 19, 20 prevent the ends of the tube 11 from being expanded and the welds 23, 25 from breaking. If the tubes 11 are thin-walled and made of mild steel, a lower water pressure than 100 bar may be sufficient, but if the tubes 11 are thick-walled and are made of harder steel, a higher pressure than 500 bar may be necessary.

When the bolt is pressurized, the outer circular portion 12 of the tube 11 will be bent into contact with the borehole and the recession 16, 17, 18 will "roll" out in its outer portions 16, 17. The peripheral length of the tube 11 is the same before and after the expansion which reduces the risk of cracking. Since the remaining recession 16–18 is so large as shown in FIG. 5, it widens inwardly as shown or at least it will have substantially parallel walls 27, 28. The pressure will act on the walls 27, 28 in the direction of compressing the recession, and, as a result, there is a force acting in the direction of widening the recession when the bolt is relieved of pressure, which increases the frictional grip between the bolt and the borehole.

In FIG. 6 a bolt is shown that differs from the one shown in FIG. 1 by its ends. Two end plates 31, 32 have been friction welded to the tube 11 and the fitting 24 has been friction welded to the outer plate 31. The fitting 24 can of course instead be affixed to the end plate 31 by means of threads. It is an advantage that a threaded fitting tube can be removed and replaced by a hook or another means in which for example conduits can be mounted when the bolt has been anchored.

In FIG. 8, the outer part of a bolt is shown that comprises a tube 11 which in contrast to the bolt shown in FIG. 1 has not the recession 16–18 along its entire length but which has a circular outer end 34 that is too wide to be inserted into the borehole. An end plate 35 with a threaded hole 36 for a fitting tube has been friction welded to the outer end of the tube 11. In FIG. 9 there is shown the bottom end of the bolt shown in FIG. 8. In FIGS. 11-13, the steps of making the end are shown. The end of the tube 11 is flattened as shown in FIG. 11 and bent as shown in FIGS. 12 and 13 before the longitudinal recession 16–18 shown in FIG. 3 is made so that the bottom end of the bolt will be as shown in FIG. 9. Thus, a tube with a circular cross-section is used for making the bolt according to FIGS. 8 and 9 and the tube is given the profile shown in FIG. 3 as the last step, whereas a tube having the profile shown in FIG. 3 is used for making the bolts shown in FIGS. 1 and 6.

In FIG. 14, the outer end of a rockbolt is shown which is modified from the rockbolt shown in FIG. 6 in that the outer strengthening sleeve 19 is threaded along its entire length so that a plate 41 can be clamped against the rock by means of a nut 42. The sleeve 19 can be secured to the tube for example by being welded to the tube 11 or to the end plate 31 of the tube.

In FIG. 15, the outer end of a bolt is shown on which a plate 43 is welded to the end of the tube 11. High pressure water can be supplied to the tube through a hole 44 in the plate 43.

In FIG. 16 which also shows the outer end of a bolt, there is a hole 45 in the sleeve 19 through which water can be supplied to expand the bolt. A rock engaging plate 46 has been loosely put onto the tube 11 before the sleeve 19 is mounted on the tube and fixed thereto. The plate 46 will take support on the sleeve 19 when the bolt is inserted in a borehole and the plate 46 contacts the rock.

In contrast to the design of FIG. 14 the plates 43 and 46 shown in FIGS. 15 and 16 cannot be tightened after the bolts have been anchored. Such tightening after the anchoring is, however, not necessary since, when the bolt is being expanded, it starts to expand at its axial mid portion and gets stuck there and as the expansion proceeds, the length of the bolt will decrease a few millimeters. This reduction of the length of the bolt will cause the plate to be forced against the rock provided that the plate is in contact with the rock before the expansion starts.

In FIG. 17, the outer end of a rock bolt similar to the one in FIG. 16 is shown. A threaded bolt 47 is inserted in the outer end as shown and it is held in position while the bolt is being expanded. The bolt will be clamped and affixed because of the expansion of the tube 11 as can be seen in FIGS. 18 and 20. The bolt 47 can be used as a support in which for example conduits can be suspended in a tunnel.

A bolt according to the invention, for example the bolt shown in FIG. 1 can be provided with a cutting edge at the front end so that it can be used to drill its own hole. Flushing fluid can during the drilling be supplied through the depression 18 shown in FIG. 3.

In FIGS. 21 and 22, there is illustrated a way of joining short rockbolts to form a long rockbolt. At first, a bolt 38 according to FIG. 1 or FIG. 6 is inserted in the borehole. It has a joining sleeve 39 attached to its outer end. Then when the bolt 38 is expanded the sleeve 39 becomes secured to the bolt by friction. Now, when this bolt 38 is anchored in the borehole, another bolt 40 is inserted in the borehole to extend into the sleeve 39. When this bolt is expanded, it will be secured to the sleeve 39 by friction. Thus, the two bolts 38, 40 and the joining sleeve 39 form a long rockbolt together.

The illustrated rockbolts are anchored by a friction grip along substantially their entire length. The bolts are preferably made of mild steel so that they will adapt to the irregularities of the borehole, for example to the helical form of the borehole. Most boreholes are somewhat helical and also when they are so little helical that the helical form is not easily noticed, the helical form improves the anchoring.

The expansion as described above is carried out by means of pressure fluid from an external source. Alternatively, it can be carried out in other ways, for example by means of an explosive in the bolt. The bolt can also be an open tube that has one or more longitudinal depressions and the expansion can be carried out mechanically by means of a mandrel that is forced into the tube.

Although expansion rockbolts with a prime object of supporting the strata have been described above, expansion bolts according to the invention can be used for other purposes, for example when the prime object is to anchor a comparatively short bolt so that it can carry an external load of any kind.

We claim:

1. In a method of rock bolting wherein an elongated tube-formed bolt is first inserted into a borehole and then expanded against the borehole,
   the improvement comprising:
   inserting a bolt freely into the borehole which, before being expanded, in its tubular cross-section has a peripheral length in a direction transverse to the axial direction of the bolt that exceeds the circumference of the borehole, the bolt having a closed cross-section and having at least a part of its closed cross-section initially inwardly collapsed toward the axis of the tube continuously along a substantial length of the tube so that in its initially collapsed state it is slimmer than the borehole and so that it can be freely inserted into the borehole; then
   expanding at least the collapsed portion of said bolt by temporarily applying an expansion medium internally of the tube such that at least the non-collapsed portion of the tube is moved into contact with the borehole to frictionally clamp against the walls of the borehole; and then
   removing the application of said expansion medium after expansion and clamping of the expanded portion of the tube against the walls of the borehole, the expanded portion of the tube remaining frictionally clamped against the walls of the borehole even after removal of application of said expansion medium.

2. Method according to claim 1, wherein said bolt is closed at its bottom end (22); and said expanding step comprises temporarily pressurizing said bolt to expand same.

3. Method according to claim 2, wherein said pressurizing step comprises connecting said bolt to an external source of pressurized fluid to expand same by said pressurized fluid, said pressurized fluid comprising said expansion medium.

4. Method according to claim 2, wherein said bolt is expanded against the borehole over a large part of its length.

5. Method according to claim 2, wherein said bolt is expanded against the borehole over substantially its entire length.

6. Method of rock bolting in a borehole for anchoring the strata of a rock formation, comprising:
   inserting in a borehole a first bolt (38) that is shorter than the borehole;
   expanding said first bolt against the walls of the borehole to clamp said first bolt against the walls of the borehole to thereby anchor said first bolt in the borehole;
   then inserting a second bolt (40) into the borehole until its inner end is adjacent to said expanded and anchored first bolt (38) and is axially overlapped by an element (39) of said expanded and anchored first bolt; and
   then expanding said second bolt against the walls of the borehole and against said element (39) of said first bolt such that it anchors in the borehole and clamps said element (39) between it and the borehole so that said two bolts (38, 40) each become anchored in the borehole and coupled to each other via said element (39).

7. Method according to claim 6, wherein said element (39) of said first bolt is a sleeve mounted within the borehole.

8. Method according to claim 7, wherein said first bolt (38) is expanded against said sleeve (39).

9. Method according to claim 6, wherein each said bolt (38, 40) is elongated and, before being expanded, in its cross-section has a closed continuous peripheral length in a direction transverse to the axial direction thereof that exceeds the circumference of the borehole; each bolt having at least a part of its closed cross-section initially collapsed so that it is slimmer than the borehole so that it can be freely inserted into the borehole.

10. Method according to claim 6, wherein each said bolt (38, 40) is elongated and, before being expanded, in its cross-section has a closed peripheral length in a direction transverse to the axial direction thereof that exceeds the circumference of the borehole; each bolt having at least a part of its closed cross-section initially collapsed so that it is slimmer than the borehole so that it can be freely inserted into the borehole; and wherein said steps of expanding said first and second bolts each comprises temporarily applying an expansion medium interla of the respective first and second bolts to clamp said bolts against the walls of the borehole to thereby anchor same in the borehole; and then removing the application of said expansion medium after expansion and clamping of the respective bolts against the walls of the borehole, the expanded and clamped portions of the respective bolts remaining in said clamped condition even after removal of application of said expansion medium.

11. A method of reinforcing rock comprising:
providing a bolt that comprises an expansible elongated tube which has a deep continuous longitudinal depression which extends inwardly of the bolt toward the axis of the bolt, the tube having a major closed cross-sectional portion in the area of the deep longitudinal depression, and the tube being closed at one end thereof which is the bottom end thereof;
drilling a hole in the rock of a diameter large enough to permit the unexpanded bolt to be freely inserted in the borehole;
inserting the bolt in the borehole with said closed bottom end first;
coupling the other end of said tube to an external source of hydraulic pressure fluid;
plastically deforming said tube by temporarily applying said high pressure fluid to the interior of said tube to expand said tube against the borehole over substantially the entire length of the bolt by expanding said depression outwardly substantially without stretching the material of the tube so as to cause permanent gripping action of the tube against the inner surface of the borehole; and
then relieving said tube of pressure and leaving the bolt anchored in the borehole.

12. A method of reinforcing rock comprising:
plastically deforming a transverse cross-section of a circular tube so that its transverse size is reduced, at least a continuous portion of said tube in its longitudinal direction having said plastically deformed cross section to form a plastically deformed portion of the tube;
drilling a hole in the rock, the hole having a diameter larger than the reduced transverse size of the plastically deformed tube so that the deformed tube can be freely inserted into the borehole;
inserting the deformed tube in the borehole; and then further plastically deforming the deformed tube in the borehole substantially without stretching the material of the tube by temporarily applying an expansion medium to the interior of the tube so that it expands the deformed portion of the tube in the transverse direction of the tube and thereby clamps at least the non-deformed exterior of the tube frictionally against the inner surface of the borehole; and then
removing the application of said expansion medium after expansion and clamping of the expanded portion of the tube against the inner surface of the borehole, the expanded portion of the tube remaining clamped against the inner surface of the borehole even after removal of application of said expansion medium.

13. The method of claim 12, wherein said borehole in said rock has a smaller diameter than the initial diameter of the circular tube.

14. Method according to claim 12, wherein in said first step, said tube is plastically deformed so that said tube, in cross-section, has a closed continuous peripheral length in a direction transversed to the axial direction of the tube that exceeds the circumference of the borehole, the bolt, in its initial plastically deformed state, having said reduced transverse size which is smaller than the diameter of the hole in the rock.

15. A method of rock bolting comprising:
providing a bolt that comprises a radially expansible elongated tube which, before being used, has a deep closed continuous longitudinal depression extending inwardly of the tube toward the axis of the tube, the tube being closed at one end therof which is the bottom end thereof, the tube having a major closed continuous cross-sectional portion at least over the longitudinally depressed portion thereof;
drilling a hole in the rock of a diameter that is larger than the largest transverse dimension of the bolt before being used but smaller than the largest transverse dimension of the bolt if said longitudinal depression is fully expanded, so that the longitudinal depression cannot be fully expanded when the bolt is in the borehole;
inserting the bolt in the borehole with said closed bottom end first;
temporarily coupling the other end of said tube to an external source of hydraulic high pressure fluid to temporarily fill the interior of the tube with the high pressure fluid under substantially static conditions so that the tube is plastically deformed under the influence of said high pressure fluid to expand said depression outwardly of the tube so as to cause permanent gripping action of the tube against the inside surface of the borehole over substantially the entire length of the tube; and
then relieving said tube of pressure by removing the external source of hydraulic high pressure fluid and leaving the bolt anchored in the borehole.

16. Method according to claim 15, wherein said tube, before being used, is plastically deformed so that said tube, in cross-section, has a closed continuous peripheral length in a direction transversed to the axial direction of the tube that exceeds the circumference of the borehole, the tube, in its initial plastically deformed state, having a transverse size which is smaller than the diameter of the borehold in the rock.

* * * * *